United States Patent
Lesieur et al.

(12) 
(10) Patent No.: US 6,258,330 B1
(45) Date of Patent: *Jul. 10, 2001

(54) INHIBITION OF CARBON DEPOSITION ON FUEL GAS STEAM REFORMER WALLS

(75) Inventors: Roger R. Lesieur, Enfield; Herbert J. Setzer, Ellington, both of CT (US)

(73) Assignee: International Fuel Cells, LLC, S. Windsor, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/190,855

(22) Filed: Nov. 10, 1998

(51) Int. Cl.$^7$ .............................. B01J 35/02; C04B 35/06; C09D 1/02
(52) U.S. Cl. .......................... 422/241; 422/211; 422/240; 106/600
(58) Field of Search ..................................... 422/241, 240, 422/168, 177, 178, 180, 211, 212, 239; 106/600

(56) References Cited

U.S. PATENT DOCUMENTS

| | | | |
|---|---|---|---|
| 3,791,143 | * 2/1974 | Keith et al. | 60/247 |
| 4,292,049 | * 9/1981 | Tanaka et al. | 51/309 |
| 4,485,191 | * 11/1984 | Sekido et al. | 502/303 |
| 4,900,712 | 2/1990 | Bar-Ilan et al. | 502/304 |
| 5,254,318 | * 10/1993 | Williams et al. | 422/197 |
| 5,486,428 | * 1/1996 | Gardner et al. | 429/19 |
| 5,805,973 | * 9/1998 | Coffinberry et al. | 428/551 |
| 5,846,915 | * 12/1998 | Smith et al. | 507/269 |
| 5,888,292 | * 3/1999 | Temblay | 106/691 |

FOREIGN PATENT DOCUMENTS

927774 A1 * 7/1999 (EP).

* cited by examiner

*Primary Examiner*—Marian C. Knode
*Assistant Examiner*—Alexa A. Doroshenk
(74) *Attorney, Agent, or Firm*—William W. Jones

(57) ABSTRACT

A fuel gas reformer assembly for use in a fuel cell power plant includes fuel gas passages, some of which contain a particulate alumina packing in which a vaporized steam-hydrocarbon fuel stream mixture is heated. The walls of the fuel gas passages are provided with an alumina coating which protects the walls of the passages from corrosion. The alumina coating of the walls, and alumina packing are both overlain by an alkaline earth metal oxide layer, such as a calcium oxide layer, that acts to limit carbon build-up on the surfaces of the coated passage walls. Limiting of carbon build-up in the reformer passages prevents premature clogging of the passages. The carbon build-up-limiting layer is formed on components of the reformer passages by applying a water-based slurry of alkaline earth metal compounds to the reformer passage surfaces, and then drying the slurry so as to solidify it. The formation of the desired crystalline phase of the coating occurs in situ on the coated passage surfaces during initial operation of the reformer. The coated packing material is operative to convert any free carbon remaining in the gas stream to carbon dioxide, or carbon monoxide, thereby further limiting carbon deposition in the assembly.

11 Claims, 1 Drawing Sheet

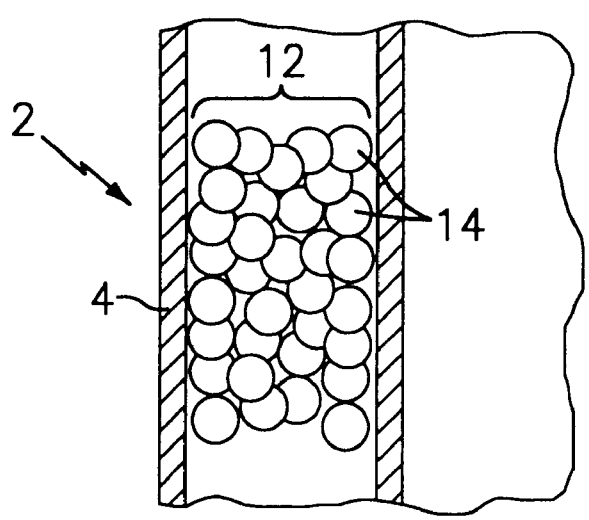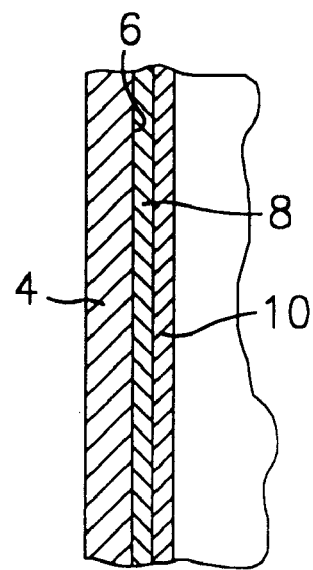
*FIG. 1*  *FIG. 2*

INHIBITION OF CARBON DEPOSITION ON FUEL GAS STEAM REFORMER WALLS

DESCRIPTION

The U.S. Government has a paid-up license in this invention and the right in limited circumstances to require the patent owner to license others on reasonable terms as provided for by the terms of Contract No. DAAH04-94-C-0010 awarded by the United States Army.

TECHNICAL FIELD

This invention relates to a fuel gas steam reformer assemblage and a method for forming the same. More particularly, this invention relates to a fuel gas steam reformer assemblage wherein the reformer gas passages are washcoated with a composite carbon-resistant alumina and alkaline earth metal oxide coating.

BACKGROUND ART

Fuel cell power plants include fuel gas steam reformers which are operable to catalytically convert a fuel gas, such as natural gas or heavier hydrocarbons, into the primary constituents of hydrogen and carbon dioxide. The conversion involves passing a mixture of the fuel gas and steam through a catalytic bed which is heated to a reforming temperature which varies depending upon the fuel being reformed. Catalysts typically used are nickel catalysts which are deposited on alumina pellets. There are three types of reformers most commonly used for providing a hydrogen-rich gas stream to fuel cell power plants. In addition, hydrocarbon fuels may be converted a hydrogen-rich gas stream by use of a partial oxidation reaction apparatus. These are a tubular thermal steam reformer, an autothermal reformer, and a catalyzed wall reformer. A typical tubular thermal steam reformer will consist of a plurality of reaction tubes which are contained in a housing that is insulated for heat retention. The reaction tubes are heated by burning excess fuel gas in the housing and passing the burner gas over the reaction tubes. The reforming temperature is in the range of about 1,250° F. to about 1,600° F. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas-steam mixture flows through the catalyst beds. The resultant heated mixture of mostly hydrogen and carbon dioxide gas then flows through the central exhaust passages in each tube so as to assist in heating the inner portions of each of the annular catalyst beds; and thence from the reformer for further processing and utilization.

A typical autothermal reformer may be a single bed or a multiple bed tubular assembly. Autothermal reformers are often used when higher operation temperatures are required for the reforming process because the fuel to be processed is more difficult to reform. In an autothermal reformer, the reaction gasses are heated by burning excess fuel within the reaction bed by adding air to the fuel and steam mixture so that the remaining fuel-steam mixture is increased to the temperature necessary for the fuel processing reaction. Typically, wall temperatures in an autothermal reformer are in the range of about 1,400° F. to about 1,800° F. Such tubular reformers are disclosed in U.S. Pat. No. 4,098,587.

A third type of prior art reformers have utilized catalyzed wall passages such as disclosed in U.S. Pat. No. 5,733,347. Such reformers are formed from a sandwich of essentially flat plates with intervening corrugated plates which form reformer gas passages and adjacent regenerator-heat exchanger passages. Each of the reformer passage plate units is disposed directly adjacent to a burner passage plate unit so that the adjacent reformer and burner passages share a common wall.

Besides the reformer devices described above, a partial oxidation reaction apparatus may also be used to produce a hydrogen-rich fuel stream. This device is typically a chamber that is fed a hydrocarbon fuel, steam and oxidant source, usually air, so that the mixture spontaneously partially oxidizes to form a hydrogen-rich mixture. Such devices, for example, are disclosed in PGT application WO 98/08771.

Each of the aforesaid prior art reformer structures may suffer from carbon buildup and deposition on the surfaces of internal components of the reformer assemblies. Carbon buildup will clog the gas passages of the reformer ultimately, and will limit the effective service life of the reformer and thus the fuel cell power plant assembly which includes the reformer. It would obviously be desirable to produce reformer assembly components, and a method for forming such components, which would result in a reformer assembly which would be resistant to carbon build-up on surfaces of the reformer.

DISCLOSURE OF THE INVENTION

This invention relates to a composite coating, and a method for forming the same, for use in fuel cell steam reformer assemblies which will result in decreased or no carbon deposition on reformer components that are covered by the composite coating. The composite coating includes an underlying alumina component and an outermost carbon formation-inhibiting metal oxide component. The reformer assembly will have it's interior steel walls coated with the alumina component, and the alumina component will have an amorphous or polycrystalline metal oxide layer formed over the underlying alumina component. Certain passages in the reformer assembly can also be provided with a metal oxide particulate bed that promotes the conversion of carbon in the steam-fuel mixture to carbon monoxide, which is subsequently converted to carbon dioxide.

The metal oxide which is used for the carbon deposition-inhibiting coating is preferably an alkaline earth metal oxide such as CaO or MgO; mixtures of alkaline earth metal oxides such as $(CaO)_X(MgO)_Y$, where "X" and "Y" are numbers between 0 and about 1; an alkaline earth metal oxide substituted with an alkali metal oxide such as $Ca_{(1-X)}Na_XO$, wherein "X" is a number between 0 and about 0.2; a rare earth oxide such as $La_2O_3$ or $CeO_2$; a rare earth oxide substituted with other rare earths, such as $Ce_{(1-X)}Gd_XO_2$, wherein "X" is a number between 0 and about 0.2; a rare earth substituted with alkaline earths such as $(CaO)_X \cdot La_2O_3$; and/or metals from the Periodic Table Group VIII transition metals, such as $(NiO)_X \cdot La_2O_3$, wherein "X" is a number between 0 and about 1.0.

Typical compositions are as follows:

TABLE 1

| Compound | Examples | Tested Values | Range of Values |
| --- | --- | --- | --- |
| alkaline earth metal oxides | $(CaO)_X \cdot (MgO)_Y$ | pure | X and Y are between 0.0 and about 1.0 |

TABLE 1-continued

| Compound | Examples | Tested Values | Range of Values |
|---|---|---|---|
| alkaline earth metal oxides substituted with alkali metal oxides | $Na_XCa_{(1-X)}O$ | 0.08 | X is between 0.0 and about 0.2 |
| rare earth oxides | $CeO_2$ or $La_2O_3$ | pure | |
| rare earth oxides substituted with rare earths | $Gd_XCe_{(1-X)}O_2$ | | X is between 0.0 and about 0.2 |
| rare earth oxides substituted with alkaline earths | $(CaO)_X \cdot La_2O_3$ | 0.2 | X is between 0.0 and about 1.0 |
| rare earth oxides substituted with group VIII transition metals | $(NiO)_X \cdot La_2O_3$ | 0.15 | X is between 0.0 and about 1.0 |

The metal oxide coating will be formed as an amorphous or polycrystalline coating which is derived from a solution of a nitrate, acetate or citrate salt of the metal which is dissolved in water, and in which a hydroxide of the metal is suspended to form the slurry. The hydroxide may be added as a metal hydroxide or formed by addition of less than a stoichiometric amount of a base such as NaOH or $NH_4OH$ to the solution which may result in a slurry or a sol-gel mixture with a percentage of soluble salts in the solution. A small amount of a surfactant is added to the slurry to aid in the dispersion of the hydroxide and increase the wetting of the reformer surfaces in question by the slurry.

In order to form a calcium oxide coating, $Ca(OH)_2$ solid is mixed with a concentrated solution of $Ca(NO_3)_2 \cdot 5H_2O$ to form the slurry. To form a lanthanum-nickel oxide coating, a solution of nickel acetate and lanthanum nitrate is made with the desired cation ration. The slurry is made by adding ammonium hydroxide which co-precipitates a portion of the nickel and lanthanum as a hydroxide. Often, the precipitate initially occurs as a sol-gel which, upon standing, ripens into a slurry. The reformer surfaces in question may be coated by the suspension in either the sol-gel state or the slurry state. Subsequent heat treatment of the coating will convert the coating to a polycrystalline or amorphous form. When proper proportions of the nitrate and the hydroxide are used, the resultant amorphous coating, when dried, will not chip or flake off of the underlying alumina layer. By utilizing the aforesaid carbon-inhibiting coating, carbon deposition on the walls of the reformer passages from the fuel being processed is greatly reduced, or eliminated.

Certain of the passages may also be provided with a metal oxide particulate constituent which is operable to convert carbon in the fuel-steam stream to carbon oxides. The metal oxide particulate material can take the form of pellets, typically spheres, rings or cylinders which are coated with calcium oxide, or any of the aforementioned compounds. The carbon conversion reaction in question is as follows:

$$C + 2H_2O \rightarrow CO_2 + 2H_2$$

It is therefore an object of this invention to provide an improved carbon deposition-inhibiting coating for a reformer assembly, and a reformer assembly which includes the improved coating.

It is a further object of this invention to provide a reformer assembly of the character described which includes a carbon-conversion component which converts carbon in the fuel gas-steam stream to carbon monoxide or carbon dioxide.

It is another object of this invention to provide a method for forming a flaking and spall-resistant carbon deposition-resistant coating on walls of a fuel gas-steam stream conduit in a fuel cell fuel gas reformer assembly.

BRIEF DESCRIPTION OF THE DRAWINGS

These and other objects and advantages of this invention will become readily apparent to one skilled in the art from the following detailed description of a preferred embodiment of the invention when taken in conjunction with the accompanying drawings in which:

FIG. 1 is a fragmented cross-sectional drawing of a fuel gas reformer passage which is formed in accordance with this invention; and FIG. 2 is a fragmented enlarged sectional view of the side wall of the passage of FIG. 1 showing the coatings deposited on the interior of the passage wall.

SPECIFIC MODE FOR CARRYING OUT THE INVENTION

Referring now to the drawings, there is shown in FIG. 1 a fragmented cross-sectional view of a portion of a fuel processing assembly passage denoted generally by the numeral 2, which forms a part of a fuel-steam mixture reformer assembly component in a typical fuel cell power plant that has been adapted in accordance with this invention. The walls 4 of the reformer passages 2 are preferably formed from an aluminized steel material, or a steel based alloy containing aluminum. As seen in FIG. 2, the interior surfaces 6 of the reformer passage walls 4 are provided with a coating 8 of alumina which serves to protect the steel from corrosion. The aluminized coating 8 is formed by a conventional aluminizing process, as described in ASTM B875, and the addition of the heat treating step which is performed at about 1,825° F. for a time period in the range of about two to about twelve hours. The aluminization and subsequent heat treatment steps combine to form a continuous adherent porous aluminum oxide coating on the steel. Such a surface is an ideal surface upon which to deposit a carbon deposition-inhibiting alkaline earth metal oxide material layer.

Selected portions of the porous alumina coating 8 are overlain and penetrated by an amorphous layer 10 of calcium oxide; magnesium oxide; a lanthanum-nickel oxide composite; alkali metal-substituted alkaline earth metal oxides such as sodium-substituted calcium oxide; and the like. The layer 10 is operable to retard or prevent carbon from depositing directly from the fuel-steam stream onto the heated walls of the passages 2 during reformer operation.

Passages 2 of a length required to raise the gas to the reformer inlet temperature will be filled with a particulate packing bed 12 which is formed from metal oxide pellets 14 of: calcium oxide coated onto an alumina substrate; a calcium oxide/iron oxide composite coated onto an alumina substrate; or other compounds, as noted above.

The following is a description of a method for forming the desired carbon-inhibiting layer in the flow passages 2. Calcium nitrate is very soluble in water, while calcium hydroxide is not. Calcium nitrate, alone, forms a waxy hygroscopic solid. Calcium hydroxide alone forms a white crystalline powder. This invention operates in a best mode with a certain concentration of calcium hydroxide-tocalcium nitrate, at which concentration, a slurry of the calcium hydroxide, in a solution of the calcium nitrate in water, gels and solidifies when heated.

Calcium hydroxide powder was added to a calcium nitrate solution to form a slurry. The slurry was painted onto the tube surfaces to be coated. As the temperature was raised, the calcium hydroxide solubility increased while the solution lost water, and thus was concentrated. Together, calcium nitrate and calcium hydroxide form a solid, amorphous or polycrystalline coating which is desirable.

Exemplary details of the aforesaid procedure are as follows. About five hundred grams of $Ca(NO_3)_2 \cdot 4H_2O$ (calcium nitrate tetrahydrate) were mixed with about three hundred thirty grams of distilled water in a one liter wide mouth plastic bottle. About 0.3 grams of concentrated $HNO_3$ was added to the aforesaid mixture. The solution was cooled and mixed until the tetrahydrate was dissolved in the water and acid. About sixty six grams of $Ca(OH)_2$ were added to the water-acid-tetrahydrate solution, and the resultant mixture was shaken whereupon the mixture gelled, and then became fluid after standing for about one to two hours at room temperature. About 1.3 to about 1.4 grams of the surfactant "TRITON X-100" was added to the fluid mixture and the mixture was shaken well before using. The reformer tubes to be coated were washed with a Liquinox® detergent and then wetted with water. The washed tubes were scoured with a beaker brush. The washed and scoured tubes were rinsed in water (about 30° to about 40° C.). The uniformly wetted tubes were dried at a temperature of 240° F., and cooled to room temperature. The surface to be coated was then painted with the slurry, using a wetted paint brush so as to minimize the amount of foam from the slurry. A thin coat was applied and excess liquid was removed with a dry paint brush. The coated parts were then heated to a temperature of 110° C. in an air oven, making sure to allow the coating to reach the aforesaid temperature. The dried coated parts were then stored in an atmosphere having a relative humidity of less than 60%.

If the ratio of nitrate-to-hydroxide in the slurry is too high, a waxy coating is obtained. A ratio of 20-to-1 nitrate-to-hydroxide produces waxy coatings. If the aforesaid ratio is too low, then powdery coatings are obtained. A ratio of 16-to-1 nitrate-to-hydroxide produces powdery coatings. A ratio of 18-to-1 nitrate-to-hydroxide results in a clear amorphous coating which is solid to the touch, and which, when heated to the decomposition temperature, i.e., greater than about 1,380° F., does not spall.

Since many changes and variations of the disclosed embodiment of the invention may be made without departing from the inventive concept, it is not intended to limit the invention other than as required by the appended claims.

What is claimed is:

1. A hydrocarbon fuel gas steam reformer assembly comprising one or more fuel gas passages for receiving a mixture of fuel gas and steam, said fuel gas passages being provided with an alumina coating which protects an interior of said fuel gas passages against corrosion, and at least portions of said alumina coating being overlain by a coating of an alkaline earth metal oxide which alkaline earth metal oxide coating inhibits carbon deposition in said fuel gas passages.

2. The reformer assembly of claim 1 wherein said gas passages include an outer steel or steel alloy component.

3. The reformer assembly of claim 1 wherein said alumina coating is porous.

4. The reformer assembly of claim 3 wherein said alkaline earth metal oxide coating penetrates pores in said alumina coating.

5. The reformer assembly of claim 1 wherein said alkaline earth metal oxide is an earth metal oxide selected from the group consisting of: calcium oxide; magnesium oxide; mixtures of calcium oxide and magnesium oxide; alkaline earth metal oxides substituted with an alkali metal oxide; rare earth oxides; rare earth oxides substituted with other rare earths; rare earth oxides substituted with oxides of alkaline earths and/or oxides of Group VIII transition metals; and mixtures of the aforesaid.

6. The reformer assembly of claim 5 wherein said alkaline earth metal oxide is a mixture of calcium oxide and magnesium oxide $(CaO)_X(MgO)_Y$, wherein X and Y are numbers between 0 and about 1.

7. The reformer assembly of claim 5 wherein said alkaline earth metal oxide substituted with an alkali metal oxide is $Ca_{(1-X)}Na_XO$ wherein X is a number between 0 and about 0.2.

8. The reformer assembly of claim 5 wherein said rare earth oxide is lanthanum oxide or cerium oxide.

9. The reformer assembly of claim 5 wherein said rare earth oxide substituted with other rare earths is $Ce_{(1-X)}Gd_XO_2$, wherein X is a number between 0 and about 0.2.

10. The reformer assembly of claim 5 wherein said rare earth oxide substituted with alkaline earth oxides is $(CaO)_X(La_2O_3)$ wherein X is a number between 0 and about 1.0.

11. The reformer assembly of claim 5 wherein said Group VIII transition metal-substituted rare earth oxide is lanthanum oxide which is substituted with $(NiO)_X$ wherein X is a number between 0 and about 1.0.

* * * * *